UNITED STATES PATENT OFFICE.

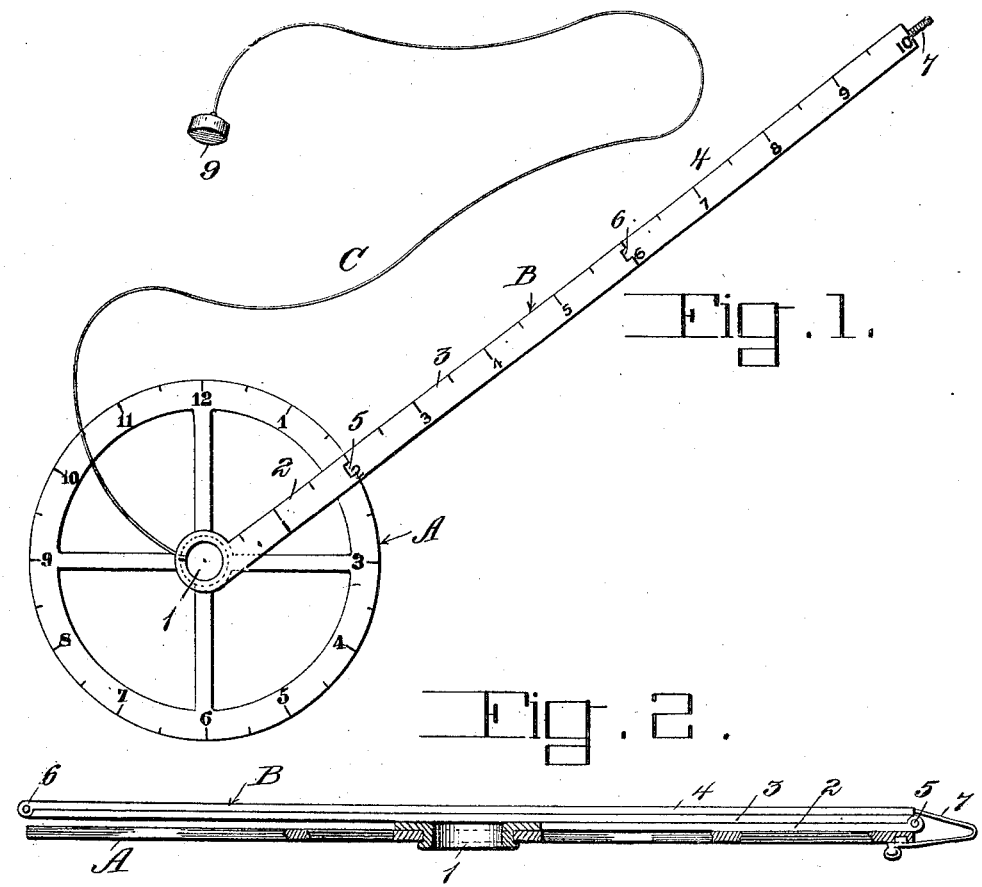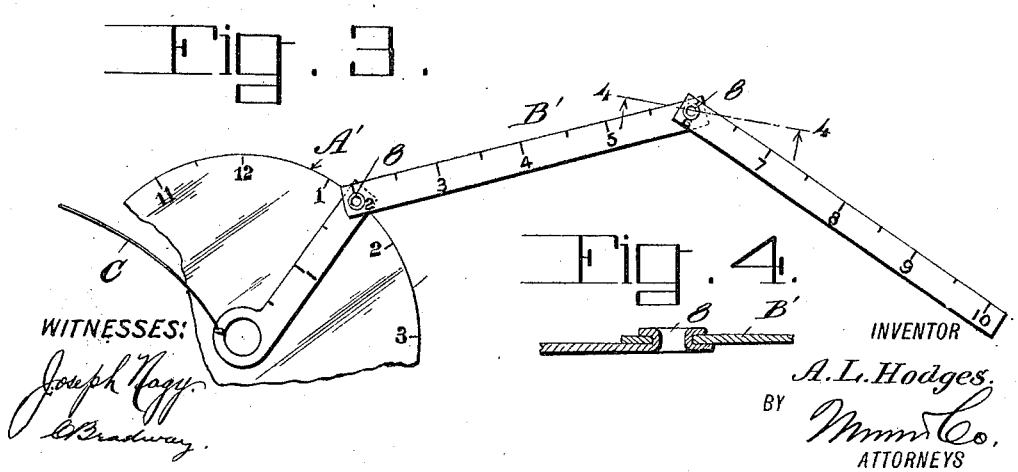

AUSTIN LAWRENCE HODGES, OF CHARLESTON, SOUTH CAROLINA.

TARGET-SIGHTING DEVICE.

1,295,897.     Specification of Letters Patent.     Patented Mar. 4, 1919.

Application filed August 13, 1917. Serial No. 185,889.

*To all whom it may concern:*

Be it known that I, AUSTIN L. HODGES, a citizen of the United States, and a resident of Charleston, in the county of Charleston and State of South Carolina, have invented a new and Improved Target-Sighting Device, of which the following is a full, clear, and exact description.

This invention relates to a device to be used by infantrymen in locating enemy or indistinct targets from orders given by the officer in command, and is adapted to be employed not only during the instruction of the soldiers in training camps but may also be used in actual field service.

An object of the invention is to provide a device so designed as to enable a target to be quickly located by reference to some given point, the device being based on the vertical clock face method and embodying a transparent or open-faced dial bearing numbers like the hour numbers of a clock and having a central peephole, and radiating from the center of the face or dial is a pivoted arm adjustable to any angle in a plane parallel with the face of the dial and having division marks thereon with reference to which the target is located while the user holds the device vertically in front of him and views the reference point selected by the commanding officer through the central peephole of the dial or disk.

A more specific object of the invention is the provision of a target sighting device including a clock face, dial or disk with an adjustable arm radiating from the center thereof and foldable so that the device can be folded into a compact space for easy storing away or carrying, and the device being provided with suitable means whereby the user can hold it at a fixed distance from the eye at all times of use.

With such objects in view, and others which will appear as the description proceeds, the invention comprises various novel features of construction and arrangement of parts which will be set forth with particularity in the following description and claims appended hereto.

In the accompanying drawing, which illustrates certain embodiments of the invention and wherein similar characters of reference indicate corresponding parts in all the views, Figure 1 is a view of the device open for use;

Fig. 2 is a horizontal section of the device folded;

Fig. 3 is a fragmentary view showing a modified form of target finding device; and Fig. 4 is a horizontal section on the line 4—4, Fig. 3, drawn on an enlarged scale.

Referring to the drawing, the clock face may be in the form of a wheel A, Fig. 1, or in the form of a disk or plate A', Fig. 3, the form shown in Fig. 1 being adapted when tin or other opaque material is employed for the face or dial, whereas in Fig. 3 the dial is made of transparent material so that the view of the user will not be obstructed. Around the edge of the face or dial are twelve numbers to correspond with the clock face divisions. At the center of the face is a peep opening 1 through which the user sights on the selected object or reference point, and from which point the target is to be located by directions given by the commanding officer. Pivotally attached to the central portion of the clock face or dial A or A' is an arm B or B', respectively, adapted to swing in a plane parallel with the clock face and to be adjusted to any angle with respect thereto. This arm is divided into certain units with relation to which the target is located. For convenience the arm is made up of a plurality of sections 2, 3 and 4 connected by hinges 5 and 6, whereby the arm can be folded behind the clock face, as shown in Fig. 2, the sections of the arm being so proportioned that when the arm is folded it is no greater than the diameter of the dial, and a suitable catch 7 may be employed to hold the arm in folded position, said catch being carried by the free end of the arm and engageable with the dial. In Figs. 3 and 4 eyelet hinges 8 are employed to hingedly connect the sections of the arm together, so that the arm will fold across the front of the dial.

To illustrate the use of the device it will be assumed that the commanding officer give the following command: "Reference point, that tall pine tree to the left. At five o'clock, three widths, brown spot. At seven hundred yards. Fire at will." The soldier holds the button in his mouth or in a buttonhole of the shirt. He holds the device vertically in front of him at arm's length, and with the twelve at the top. He now moves the arm until it cuts the five o'clock mark, and moves the device until the central hole covers the tall pine tree. He then looks along the arm until the third graduation is reached, and just here, if the officer has given the command correctly, he will see a particular brown spot which the officer has previously found by the aid of binoculars to be a squad of men. The soldier now sets his leaf sight at seven hundred yards and fires at the brown spot designated by the officer and which the soldier located by the aid of the device.

The device may be used also in what is known as the horizontal clock face system of directing fire or finding a target. In this use, the dial is held horizontally with the operator's eye held above the center of the dial and righting along the arm placed in the proper position.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A target finding device comprising a graduated dial and having a central peep opening, an arm pivoted at the center of the dial and having division marks and adapted to move in a plane parallel with the dial, and means attached to the device for facilitating the holding of the same at a fixed distance from the eyes.

2. A target finding device comprising a graduated dial and having a central peep opening, an arm pivoted at the center of the dial and having division marks and adapted to move in a plane parallel with the dial, a string attached to the dial, and means on the string adapted to be held in the mouth of the user for insuring the holding of the device at a fixed distance from the eyes.

3. A target finding device comprising a graduated dial and having a central peep opening, and an arm pivoted at the center of the dial and having division marks and adapted to move in a plane parallel with the dial, said arm being made up of foldably connected sections adapted to be folded over the dial.

AUSTIN LAWRENCE HODGES.

Copies of this patent may be obtained for five cents each, by addressing the "Commissioner of Patents, Washington, D. C."